Patented Dec. 2, 1947

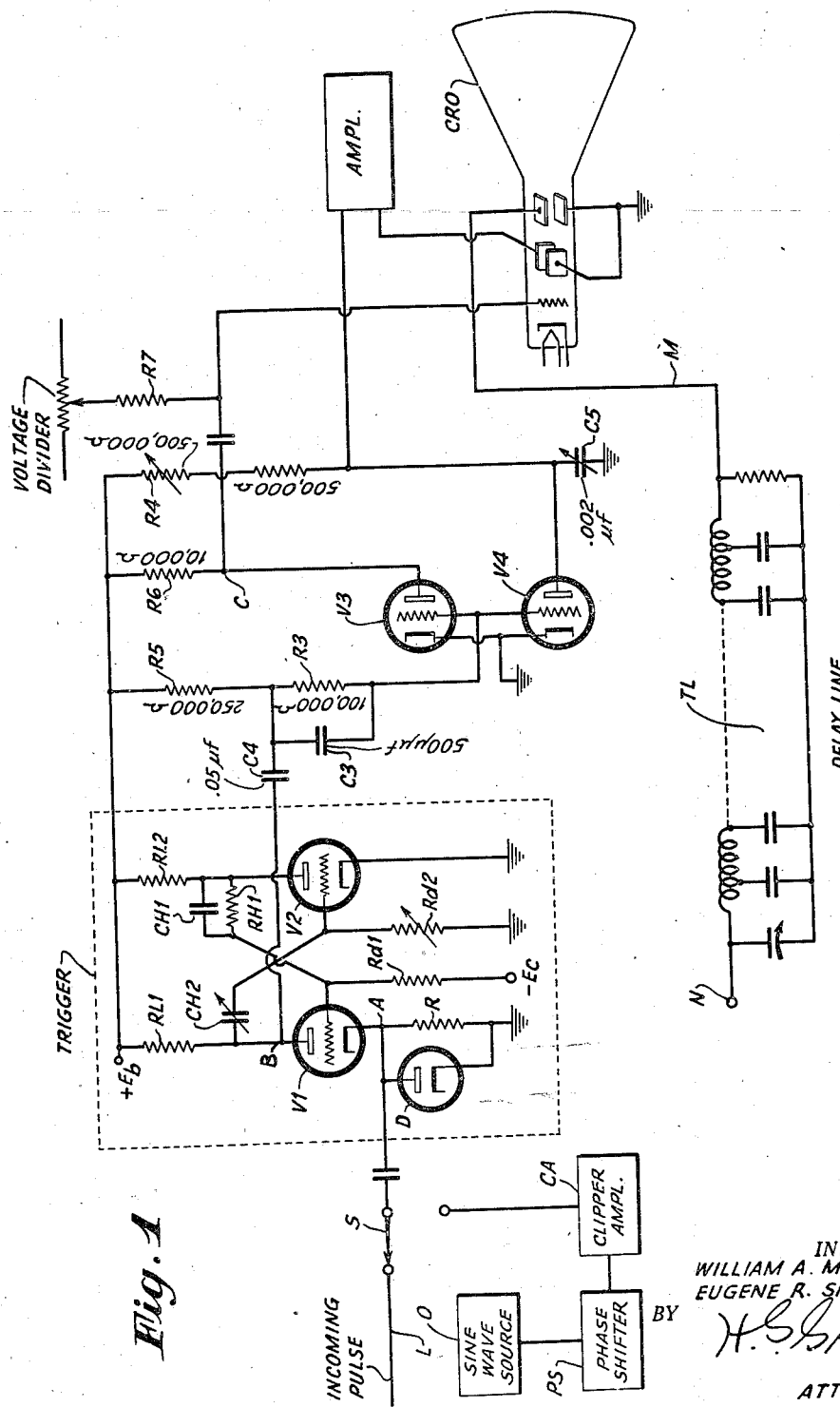

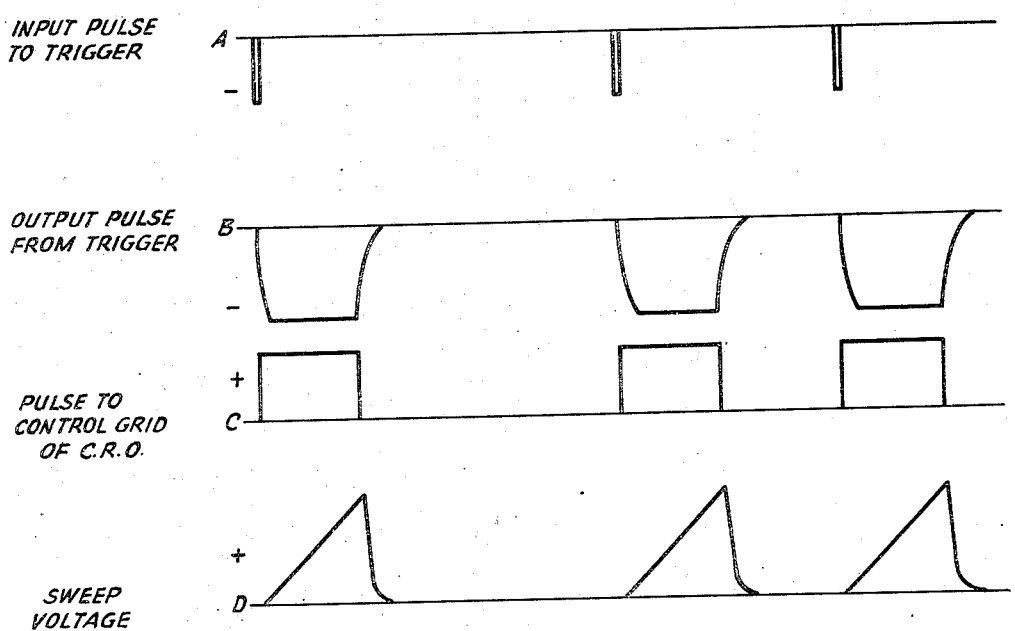

2,431,766

UNITED STATES PATENT OFFICE 2,431,766

MODIFIED SWEEP CIRCUIT FOR CATHODE-RAY TUBES

William A. Miller, Port Jefferson, and Eugene R. Shenk, Brooklyn, N. Y., assignors to Radio Corporation of America, a corporation of Delaware Application September 10, 1943, Serial No. 501,764

1 Claim. (Cl. 315—22)

This invention relates generally to systems employing cathode ray tubes for obtaining oscillographic observations of wave forms.

For most of the applications in which cathode ray oscilloscopes are used, a linear time base or sweep circuit is employed wherein the duration of the forward trace is made as nearly equal to the period of the sweep frequency as possible. There is a demand, however, in some kinds of oscillographic observations for increasing the definition over the entire cathode ray sweep path so that the detail of the reproduced wave form may be expanded for closer scrutiny. This is particularly desirable in cases where the wave form to be examined is in the form of a pulse whose duration is extremely short compared to the time between pulses. In such cases, it is highly desirable that the duration of the forward trace of the sweep circuit be equal to or approximately equal to the duration of the pulses to be examined. Putting it in other words, it is desired that the reproduced wave form of short duration be expanded to cover the entire width of the screen of the cathode ray oscilloscope.

The present invention, broadly stated, comprises a circuit for expanding a short duration pulse or wave form to be examined so that it covers substantially the entire width of the screen of the oscilloscope. Generally speaking, this is done by controlling the sweep circuit or saw-tooth wave generator coupled to the horizontal beam deflection elements of the cathode ray tube, so that the duration of the forward trace is equal to or only slightly longer than the duration of the pulse or wave form to be examined. The apparatus for achieving this result includes, in the preferred form of the invention, a trigger circuit under control of the incoming pulse, a saw-tooth generator or sweep circuit under control of the trigger circuit, and an arrangement for controlling the "on" and "off" time of the cathode ray beam also under control of the trigger circuit.

A more detailed description of the invention follows in conjunction with the drawing, wherein Fig. 1 illustrates, by way of example only, one embodiment of the present invention, and Fig. 2 graphically illustrates the operation of the system of Fig. 1.

Referring to Fig. 1 in more detail, there is shown within the box labeled "Trigger," a circuit of the type more specifically described by us in our application Serial No. 492,872, filed June 30, 1943. This trigger circuit is controlled by an incoming pulse of negative polarity applied over lead L. This pulse, it is assumed, is the actual wave form or is derived from the wave form to be examined on the cathode ray oscilloscope labeled "CRO." The output of the trigger is applied through condenser C4 and condenser-resistor combination C3—R3 to the vacuum tubes V3, V4. These vacuum tubes are normally conducting in the absence of an output pulse from the trigger and are rendered non-conductive for the duration of the pulse from the trigger. The vacuum tube V4 in combination with the condenser C5 and resistor R4 comprises a saw-tooth generator under control of the trigger. The vacuum tube V3 in combination with resistor R6 and a circuit connection to the grid of the cathode ray tube comprises an arrangement for controlling the flow of electron current through the cathode ray tube under control of the output from the trigger. It should be noted that the horizontal deflection plates of the cathode ray tube are effectively coupled to the sweep circuit or saw-tooth generator, while the vertical deflection plates are effectively coupled to the incoming line L through lead M and a delay circuit comprising line TL.

The trigger circuit comprises a pair of vacuum tubes V1, V2 whose grid and anode electrodes are interconnected to provide a regenerative action. Resistors RL1, RL2 are connected between the positive terminal $+E^b$ of a source of anode polarizing potential (250 volts positive, for example), and the anodes of tubes V1, V2, respectively. The anode of tube V1 is connected at point B to the grid of tube V2 through a variable condenser CH2, while the anode of tube V2 is connected to the grid of tube V1 through a resistor-shunt condenser arrangement RH1, CH1. The grid of tube V1 is connected to the negative terminal $-Ec$ of a source of biasing potential through resistor $Rd1$. The grid of tube V2 is connected to ground through a resistor $Rd2$. Resistors RL1 and RL2 might be relatively small compared to the values of $Rd1$ and $Rd2$. Normally, in the operation of the trigger circuit, tube V1 is non-conductive and biased to cut-off by means of source $-Ec$. Tube V2 is normally in a conductive state and passes current because the grid is maintained at substantially zero bias. This condition of operation wherein tube V1 is normally non-conductive and tube V2 is normally conductive is called the stable state of the trigger circuit. In the active or unstable state, however, the current passing conditions of the tubes V1 and V2 are reversed from that just described. After an interval of time in the active state, depending in part upon the time constants of the elements CH2 and R*d*2, the trigger circuit will restore itself to the stable state. It will thus be seen that the trigger circuit has only one degree of electrical stability.

It should be noted that the cathode of tube V1 has in circuit therewith a resistor R which is shunted by a diode D. This resistor R may have a relatively high value of resistance. The diode D, it should be noted, is an open circuit for the negative input pulse to be applied to the incoming line L. In the operation of the trigger circuit, it is necessary to apply a negative pulse to line L, which negative pulse must be of sufficient amplitude to overcome the negative bias on the grid of tube V1, thus causing the tube V1 to pass current. The application of a negative pulse to the cathode of the tube V1 is equivalent to the application of a positive pulse to the grid of the same tube. When tube V1 starts to conduct, the diode D will provide a low resistance shunt path around the relatively high resistance of resistor R. Simultaneously with the change in condition of tube V1 from the non-conductive to the conductive state, the tube V2 will change from its conductive to its non-conductive state. The trigger circuit will be restored to normal or its stable state after a time interval determined mainly by the time constant of CH2 and resistor R*d*2. The diode D serves also to quickly dissipate the negative input pulse on line L, which is used to initiate the active period and thus obviate any effect the duration of the input pulse might have had on the trigger circuit during its active state. A rectangular wave output pulse is obtainable from the anode of tube V1, such as at terminal B. This output pulse will be in a negative direction and is applied to condenser C4. For a more detailed description of this type of trigger, reference is made to our copending application Serial No. 492,872, supra.

Vacuum tubes V3, V4 which are controlled by the output pulse from the trigger circuit are normally conductive. Both of these tubes may, if desired, be placed within a single envelope. The cathodes of these two tubes are directly connected together and to ground. The grids of these two tubes are also connected together and connected to one terminal of the condenser-resistor combination C3, R3, the other terminal of which is connected to the condenser C4 in circuit with the output of the trigger. Connected to the anode of tube V4 are the variable condenser C5 and resistor R4 in series between ground and the positive source E$_b$. The anode of tube V4, it should be noted, is connected to the junction point between resistor R4 and the condenser C5. This same point is connected to the horizontal deflection plates of the cathode ray tube CRO through a suitable amplifier AMPL. In effect, the tube V4 and the condenser C5 and the resistor R4 comprise a saw-tooth generator or sweep circuit. Normally, in the absence of an output pulse from the trigger circuit (that is, in the absence of an incoming pulse over line L), there is a low impedance path between the terminals of the condenser C5 through the normally conducting tube V4. The application of a negative pulse to the grid of tube V4 from the output of the trigger will, however, render the tube V4 non-conductive and thus permit a charge to be built up, gradually and linearly, on condenser C5 through resistor R4. The charge on condenser C5 will build up until the end of the rectangular pulse from the trigger circuit which will occur when the trigger returns to its stable state, at which time the vacuum tube V4 will again pass current and discharge the condenser C5 through the low impedance space path of the tube V4 in its current passing condition. A saw-tooth wave form is thus built up across the condenser C5, and is applied to the horizontal deflection amplifier.

At this time it should be noted that due to the presence of condenser C3, the leading edge of the output pulse from the trigger (as obtained from condenser C4) is coupled directly to the grids of vacuum tubes V3 and V4. This is due to the fact that momentarily condenser C3 acts as a short circuit across resistor R3. The magnitude of this pulse, as seen by the grids of V3 and V4, is sufficiently negative to drive both tubes V3 and V4 past the current cut-off point, even though the grids of these two tubes are connected through resistors R3 and R5 in series to the positive source E$_b$.

Normally, the grid of the cathode ray tube is so biased by means of resistor R7 and the adjustment from the tapping point of this resistor R7 on the voltage divider as to cut-off the flow of electrons from the cathode to the fluorescent screen. The application of a negative pulse from the output of the trigger to the grid of tube V3 of a magnitude sufficiently negative to cut-off the flow of current through this tube, momentarily raises the potential on the anode of the tube V3 and hence on the grid of the cathode ray tube. This rise of the potential is sufficient to overcome the cut-off bias on the grid of CRO and to permit electrons from the cathode of tube CRO to flow to the fluorescent screen. The positive voltage pulse applied to the grid of the cathode ray tube is sometimes called an intensifier pulse and its magnitude is controllable by adjustment of the value of resistor R6.

In effect, the change of condition of tube V3 from the current passing state to the non-conductive state causes a positive voltage pulse to be applied to the grid of the CRO tube of such character that the rate of change of voltage at the beginning and end of this positive voltage pulse is exceedingly large. The application of this positive voltage pulse to the grid of the cathode ray tube makes the spot visible on the fluorescent screen only during the sweep which is simultaneously being applied to the horizontal deflection plates. The desire for the rapid rates of change at the beginning and end of the positive voltage pulse applied to the grid of the CRO tube is fostered by two circumstances; namely (1) the spot on the screen must be brought to visibility exactly at the time that the sweep voltage starts, and (2) this spot must be reduced to invisibility immediately at the end of the sweep period because the sweep voltage generator may not be inherently capable of bringing the sweep voltage to zero as rapidly as desired. It will thus be seen that the tube V3 and its associated elements provide a circuit for deriving from an input wave form of negative direction or polarity (as from the output of the trigger) only a section thereof which is essentially square in form. Thus, if the output pulse from the trigger has one or more drooping or curved edges, the tube V3 and its associated elements will, if properly chosen, allow only the section of the applied pulse to be passed which is essentially square in form. For example, by varying R5, the amount of negative voltage that must be applied to the grid of tube V3 before it has any appreciable effect upon the plate current flowing in this tube can be determined. Also, of course, once the grid voltage of these tubes is sufficiently negative to stop the flow of plate current, a greater negative voltage on the grid cannot further affect the plate current. Thus, only the portions of the pulses beyond the critical or threshold value will have any important effect upon the plate current of tube V3.

In order to view the incoming pulse on the cathode ray tube, a connection is provided between the incoming pulse and the vertical deflection plates of the cathode ray tube through a delay circuit TL and lead M, as shown. The delay circuit TL, which may be an artificial or actual transmission line, assures the fact that the wave form or pulse to be viewed on the oscilloscope commences exactly at the time or a little later than the start of the sweep voltage applied to the horizontal deflection plates. Thus, by suitable design of the line TL, compensation may be provided for the delay between the occurrence of the incoming pulse and the start of the saw-tooth wave form, due to slight delays in the operation of the trigger circuit and the associated elements coupling its output to the electrodes of the cathode ray tube. In practice, it will be found that the actual delay between the application of a pulse of negative polarity to lead L and the start of the saw-tooth sweep voltage may be made of the order of a small fraction of a microsecond. Where a pulse of several microseconds duration is involved, it may not be necessary to compensate for this small delay, in which case the wave form to be observed can be connected directly to lead M associated with the vertical deflection plates without any intervening artificial line. Where it is desired to view the entire wave form to be observed, then it may be advisable to insert the delay circuit TL in order to assure the fact that the entire pulse or wave form to be observed appears as a picture on the fluorescent screen of the CRO tube. The reason that a direct connection has not been shown between the input terminal N of the transmission line and the lead L is because in some cases it may be desired to apply the wave form to be observed on the oscilloscope directly to the input terminal N while this same wave form may be applied through suitable wave shaping circuits and/or inverter circuits to obtain at lead L a sharp negative pulse of suitable magnitude to change the condition of stability of the trigger circuit. In either case, where a wave shaping circuit is unnecessary before the trigger, then the incoming pulse can be applied to the lead L and directly to the input terminal N of the delay circuit TL. Of course, in cases where the diode D in its conducting state would provide a considerable load on line L, it is desirable to provide suitable isolation between line L and terminal N.

The operation of the system is graphically illustrated in Fig. 2, wherein the pulses on the lines represented by the letters A, B, C and D illustrate the wave forms of the voltage pulses at similarly labeled points in the system of Fig. 1. Thus, the incoming or tripping pulses applied to point A on the cathode of vacuum tube V1 of the trigger circuit are shown to be relatively sharp pulses of negative polarity. The substantially rectangular pulses appearing at point B of the anode circuit of vacuum tube 1 of the trigger circuit are the output pulses from the trigger circuit and are of a duration considerably greater than the input pulses applied to point A. It should be noted that these output pulses from the trigger are in the negative direction and have slightly sloped starting and trailing edges. Intensifier or positive voltage pulses which are applied to control the grid of the cathode ray tube appear at C and are extremely steep wave pulses of substantially the same duration as the output pulses from the trigger. The sharp slopes of the pulse at C illustrate the fact that the rate of change of amplitude at the beginning and end of these pulses is very great. In this way, the electron beam or the spot on the fluorescent screen of the cathode ray tube is turned "on" and "off" almost instantaneously. The saw-tooth or sweep voltage which appears at point D and is applied to the horizontal deflection plates through a suitable amplifier has a duration equal to the duration of the intensifier or positive voltage pulse applied to the control grid of the cathode ray tube, as shown at C. It should be noted that although the slope or end of the saw-tooth wave pulse is not a straight vertical line, the return trace will not appear on the fluorescent screen of the cathode ray tube. The reason for this is that the instantaneous or sharp cut-off of the positive voltage pulse to the control grid of the CRO tube occurs exactly at the end of the forward trace of the saw-tooth or sweep voltage and therefore renders any return trace invisible.

It should be understood that the relative durations of the wave forms shown in Fig. 2 are given merely by way of exposition, and are variable by adjustment of the various circuit elements. For example, the output pulse B from the trigger can be made longer or shorter than the pulse applied to its input. Further, pulse A applied to trip the trigger need not be the actual incoming pulse to be viewed on the oscilloscope. It is contemplated that the incoming pulse can be reshaped to a much shorter duration pulse for tripping the trigger. This tripping pulse can look like pulse A, while the incoming pulse will have a duration substantially equal to that of pulse C and be applied to terminal N of the delay circuit TL. From a practical standpoint, the time occupied by the reshaped pulse is usually only slightly greater than the original pulse.

The advantages of the present invention are as follows: (1) It is possible to so expand the wave form to be observed on the cathode ray oscilloscope that even a very short pulse will cover the entire width of the fluorescent screen of the oscilloscope. (2) The incoming pulse or wave form to be observed need have no special recurrence rate and may in fact be of random character, inasmuch as the occurrence or application of this pulse to the system of the invention will immediately start the sweep voltage generator functioning. (3) By preventing the cathode ray beam from striking the fluorescent screen on the oscilloscope except at those times when a wave form to be observed triggers the system, there is avoided the possibility of burning the fluorescent coating at the point where the beam would normally appear on the screen in the absence of a sweep voltage. (4) The intensifier or positive voltage pulse applied to the control grid of the oscilloscope CRO is automatically phased with the saw-tooth voltage applied to the horizontal deflection plates, due to the fact that both of these voltage waves are initiated by the same negative pulse from the trigger circuit.

While the system as so far described is essentially a start-stop system under control of the incoming pulses, it may, if desired, be operated synchronously with the operation of a source of periodically recurring pulses. Where this last feature is desired, there may be provided a source of sinusoidal waves O whose output is coupled to a phase shifter PS, the latter in turn preferably being coupled to a clipper amplifier CA in whose output appears sharp periodically recurring negative pulses. By moving switch S in the input of the trigger circuit, to disconnect the trigger circuit from the line L and to connect it to the clipper amplifier, the system of the invention will then function synchronously at the repetition rate of the source O. The phase shifter PS allows a shift to be made in the starting time of the trigger circuit relative to the voltage wave form to be examined, in which case it will not be necessary to employ the delay circuit TL.

The particular values of resistors and condensers shown on Fig. 1 of the drawing are merely by way of example, and are one set of values employed in an actual embodiment of the invention successfully tried out in practice.

What is claimed is:

In combination, first and second vacuum tubes each having a grid, a cathode and an anode, a direct connection between said cathodes, a direct connection between said grids, a connection from ground to said cathodes, a condenser connected between the anode of said first tube and ground, a source of positive potential, a resistive connection between said source and said grids, whereby said tubes normally pass current, separate resistive connections between said source and the anodes of said tubes, a cathode ray oscilloscope having a control grid connected to the anode of said second tube and an electron beam deflection element coupled to the anode of said first tube, and means for supplying pulses of energy of such polarity and magnitude to points intermediate the ends of said first resistive connection as to momentarily bias said tubes to cut-off, whereby said control grid is momentarily biased to render the electron beam visible on the screen of said cathode ray oscilloscope, and a charge is permitted to build up on said condenser for deflecting said electron beam.

WILLIAM A. MILLER.
EUGENE R. SHENK.

REFERENCES CITED

The following references are of record in the file of this patent:

UNITED STATES PATENTS

| Number | Name | Date |
|---|---|---|
| 2,108,152 | Tolson | Feb. 15, 1938 |
| 2,355,363 | Christaldi | Aug. 8, 1944 |
| 2,347,008 | Vance | Apr. 18, 1944 |
| 2,248,975 | Faudell | July 15, 1941 |
| 2,265,848 | Lewis | Dec. 9, 1941 |
| 2,350,069 | Schrader et al. | May 30, 1944 |
| 2,329,137 | Richards | Sept. 7, 1943 |
| 2,297,742 | Campbell | Oct. 6, 1942 |
| 2,328,248 | Andrieu | Aug. 31, 1943 |
| 2,201,020 | Bagno | May 14, 1940 |
| 2,241,256 | Gould | May 6, 1941 |